US010513406B2

(12) United States Patent
Kim et al.

(10) Patent No.: US 10,513,406 B2
(45) Date of Patent: Dec. 24, 2019

(54) POST PROCESSING APPARATUS

(71) Applicant: FUJI XEROX CO., LTD., Tokyo (JP)

(72) Inventors: Changyu Kim, Incheon (KR); Woong Lee, Incheon (KR)

(73) Assignee: FUJI XEROX CO., LTD., Tokyo (JP)

(*) Notice: Subject to any disclaimer, the term of this patent is extended or adjusted under 35 U.S.C. 154(b) by 9 days.

(21) Appl. No.: 15/681,893

(22) Filed: Aug. 21, 2017

(65) Prior Publication Data
US 2018/0273321 A1 Sep. 27, 2018

(30) Foreign Application Priority Data

Mar. 23, 2017 (JP) ................................. 2017-057217

(51) Int. Cl.
*B65H 5/22* (2006.01)
*B65G 51/02* (2006.01)
*B65H 29/12* (2006.01)
*B65H 29/52* (2006.01)
*B65H 31/02* (2006.01)
*G03G 15/00* (2006.01)
*G03G 21/20* (2006.01)

(52) U.S. Cl.
CPC ............ *B65H 5/228* (2013.01); *B65G 51/02* (2013.01); *B65H 29/125* (2013.01); *B65H 29/52* (2013.01); *B65H 31/02* (2013.01); *G03G 15/6573* (2013.01); *B65H 2301/4212* (2013.01); *B65H 2404/611* (2013.01); *B65H 2405/11151* (2013.01); *B65H 2406/122* (2013.01); *B65H 2407/311* (2013.01); *B65H 2801/27* (2013.01); *G03G 21/206* (2013.01)

(58) Field of Classification Search
CPC .... B65H 5/228; B65H 29/245; B65H 29/246; B65H 29/247; B65H 2406/10; B65H 2406/112; B65G 51/02
See application file for complete search history.

(56) References Cited

U.S. PATENT DOCUMENTS 4,420,152 A * 12/1983 Miyashita ............. B65H 29/56
271/309
6,522,841 B2 * 2/2003 Horikoshi ............. B65H 29/14
271/211
8,655,242 B2 * 2/2014 Tanaka ................ G03G 15/2028
399/159

(Continued)

FOREIGN PATENT DOCUMENTS

JP       63-159836 A       7/1988
JP       2011-184176   *   9/2011

OTHER PUBLICATIONS

Machine translation of JP2011-184176. (Year: 2011).*

*Primary Examiner* — Thomas A Morrison
(74) *Attorney, Agent, or Firm* — Sughrue Mion, PLLC

(57) ABSTRACT

A post processing apparatus includes a post processing unit that performs a post process on a sheet of paper, a duct, and a blower that blows an airflow to the duct. The post processing apparatus has a transport path through which the sheet is transported toward the post processing unit. The duct is provided in a width direction of the transport path. The duct has a slit formed in a sheet width direction, and the airflow having been blown by the blower is blown through the slit toward the sheet transported to the post processing apparatus.

14 Claims, 6 Drawing Sheets

(56) References Cited

U.S. PATENT DOCUMENTS

| | | | | |
|---|---|---|---|---|
| 8,925,917 B2* | 1/2015 | Watanabe | ............... | B65H 29/00 |
| | | | | 271/211 |
| 9,075,391 B2* | 7/2015 | Ono | ................... | G03G 15/6552 |
| 10,052,886 B2* | 8/2018 | Reinsch | ................... | B41F 21/00 |
| 2008/0202302 A1* | 8/2008 | Hayashi | ................. | B26D 7/025 |
| | | | | 83/256 |

* cited by examiner the sheet transport device 12.

POST PROCESSING APPARATUS

CROSS-REFERENCE TO RELATED APPLICATIONS

This application is based on and claims priority under 35 USC 119 from Japanese Patent Application No. 2017-057217 filed Mar. 23, 2017.

BACKGROUND

Technical Field

The present invention relates to a post processing apparatus.

SUMMARY

According to an aspect of the present invention, a post processing apparatus includes a post processing unit that performs a post process on a sheet of paper, a duct, and a blower that blows an airflow to the duct. The post processing apparatus has a transport path through which the sheet is transported toward the post processing unit. The duct is provided in a width direction of the transport path. The duct has a slit formed in a sheet width direction, and the airflow having been blown by the blower is blown through the slit toward the sheet transported to the post processing apparatus.

BRIEF DESCRIPTION OF THE DRAWINGS

Exemplary embodiment of the present invention will be described in detail based on the following figures, wherein.

DETAILED DESCRIPTION

Next, an exemplary embodiment of the present invention will be described with reference to the drawings.

Figure 1:
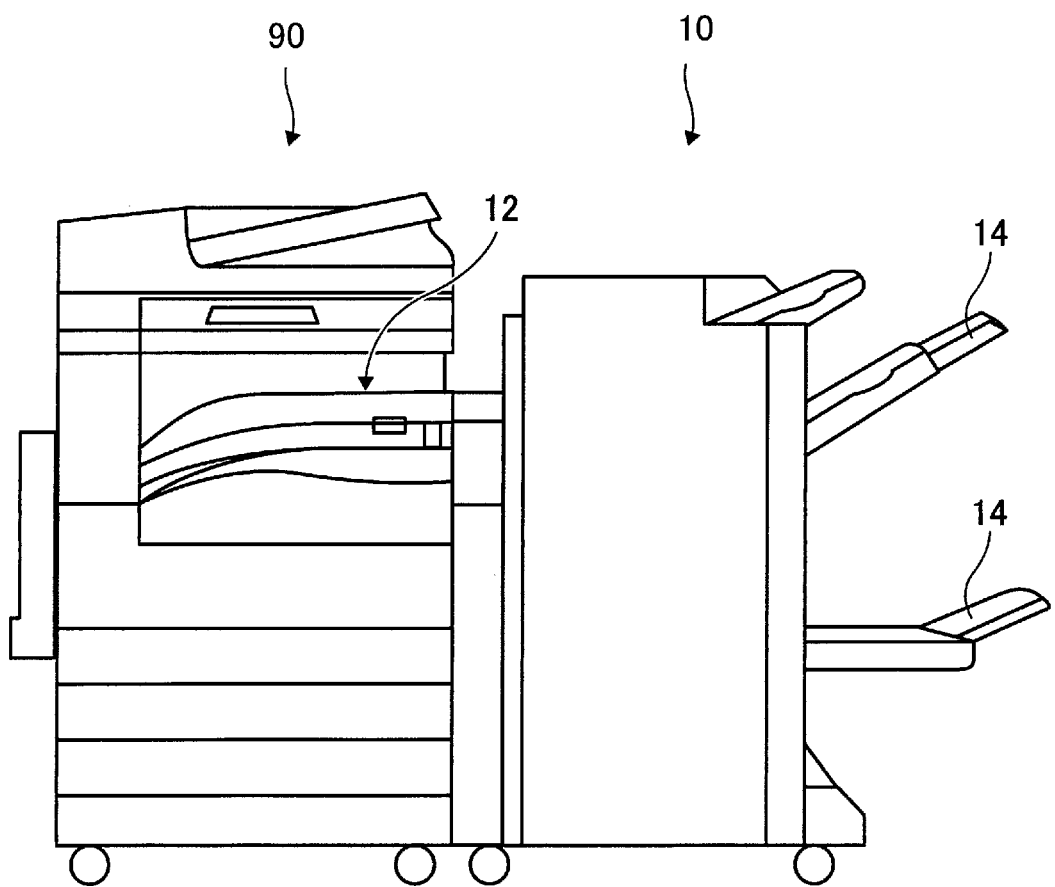
FIG. 1 illustrates a state in which a post processing apparatus according to an exemplary embodiment of the present invention is attached to an image forming apparatus.

FIG. 1 illustrates a state in which a post processing apparatus 10 according to the present exemplary embodiment is attached to an image forming apparatus 90.

The post processing apparatus 10 includes a sheet transport device 12. A sheet output opening of the image forming apparatus 90 is connected to a sheet receiving opening of the sheet transport device 12.

The image forming apparatus 90 is a so-called multifunction machine that has plural functions such as a printing function, a scanning function, a duplicating (copying) function, and a facsimile function.

As illustrated in FIG. 1, in the post processing apparatus 10, a printing sheet having been output from the image forming apparatus 90 is received by the sheet transport device 12, transported to a post processing unit, and subjected to post processes such as stapling in the post processing unit. After that, the printing sheet is output to an output tray 14.

Here, the post processes are performed on a sheet on which an image has been formed. The post processes include, for example, a stapling process, a punching process, a binding process, and a sheet output process.

Figure 2:
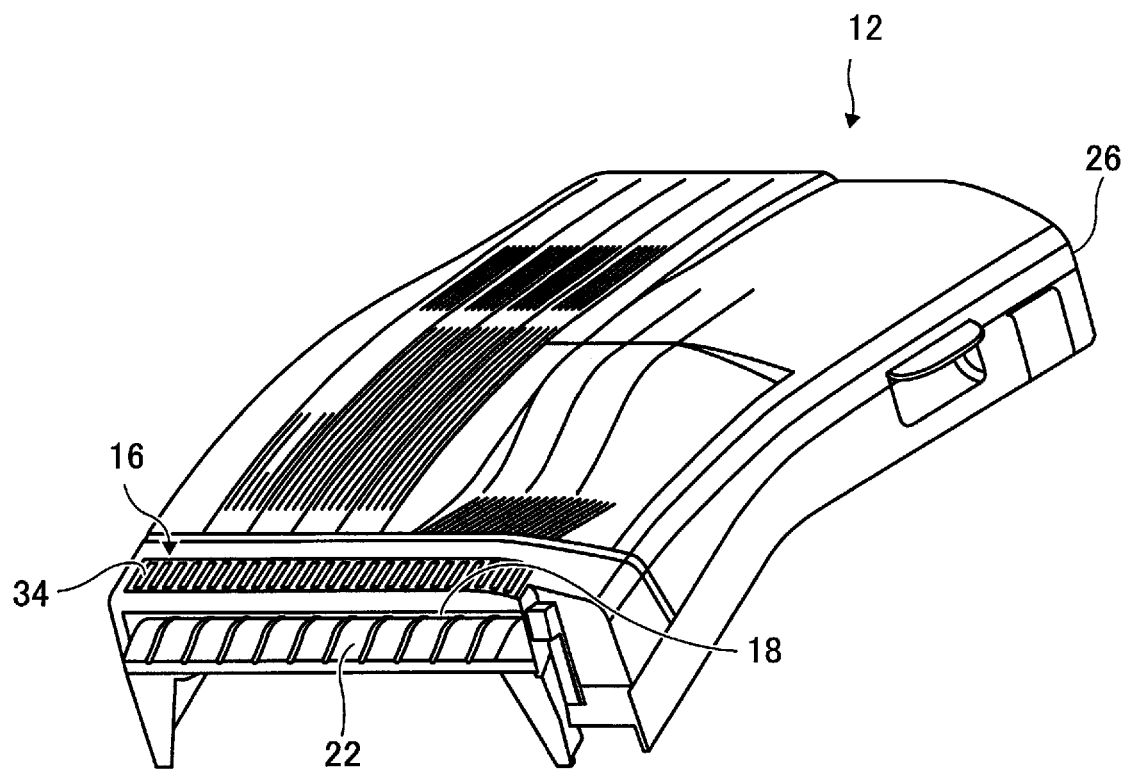
FIG. 2 is a perspective view of a sheet transport device of the post processing apparatus according to the exemplary embodiment of the present invention.

FIG. 2 is a perspective view of the sheet transport device 12.

A sheet receiving opening 18 is formed at a front end of the sheet transport device 12. Furthermore, a sheet output opening 26 is formed at a rear end of the sheet transport device 12. Furthermore, a duct 16 is provided at a portion located at the front end of the sheet transport device 12 and on the upper side of the sheet receiving opening 18. The duct 16 defines part of the sheet receiving opening 18.

The sheet receiving opening 18 communicates with the sheet output opening of the image forming apparatus 90.

The sheet received through the sheet receiving opening 18 is output to the post processing unit through the sheet output opening 26.

The duct 16 is provided in a direction that is perpendicular to a sheet transport direction and that is the width direction of a transport path. Plural outlets 34 through which air is discharged from a portion of the transport path near the sheet receiving opening 18 to the outside of the device are formed in a sheet width direction in an upper surface of the duct 16 side-by-side.

That is, the printing sheet output from the image forming apparatus 90 passes through the sheet receiving opening 18 of the sheet transport device 12, a portion below the duct 16, and the sheet transport path in the sheet transport device 12. Then, this printing sheet is output through the sheet output opening 26 and transported toward the post processing unit.

Figure 3:
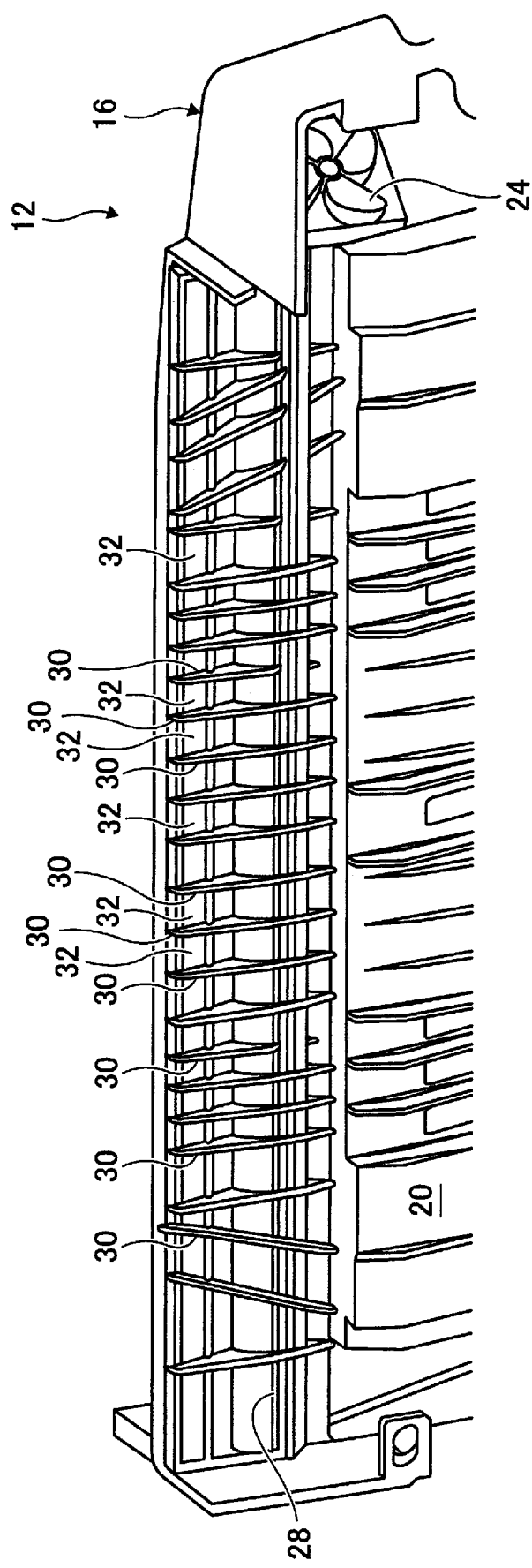
FIG. 3 is a perspective view illustrating a duct and a region near the duct of the sheet transport device according to the exemplary embodiment of the present invention seen from a transport path side.

FIG. 3 is a perspective view illustrating the duct 16 and a region near the duct 16 of the sheet transport device 12 seen from the transport path side.

A fan motor 24 serving as a blower is provided at an end portion of the duct 16. The fan motor 24 is rotated so as to supply the air into the duct 16, thereby an airflow flows from one end side toward the other end side in the sheet width direction in the duct 16.

A slit 28 is formed in the transport-path width direction in a lower surface of the duct 16 that faces the transport path. The slit 28 has an elongated shape. The width of the slit increases as the distance from the side where fan motor 24 is disposed increases.

Furthermore, a guide member 30 is provided in a lower surface of the duct 16. This lower surface faces a transport path. The guide member 30 extends in the sheet transport direction. The guide member 30 includes plural blade members. Each of the blade members is perpendicular to the sheet transported to the sheet transport device 12.

Furthermore, the guide members 30 are also provided at a portion of the duct 16 where the slit 28 is formed so as to prevent the leading end of the sheet having been transported to the sheet transport device 12 from reaching the slit 28. Also, contact of the sheet having been transported to the sheet transport device 12 with the duct 16 caused by an electrostatic force is prevented.

Figure 4:
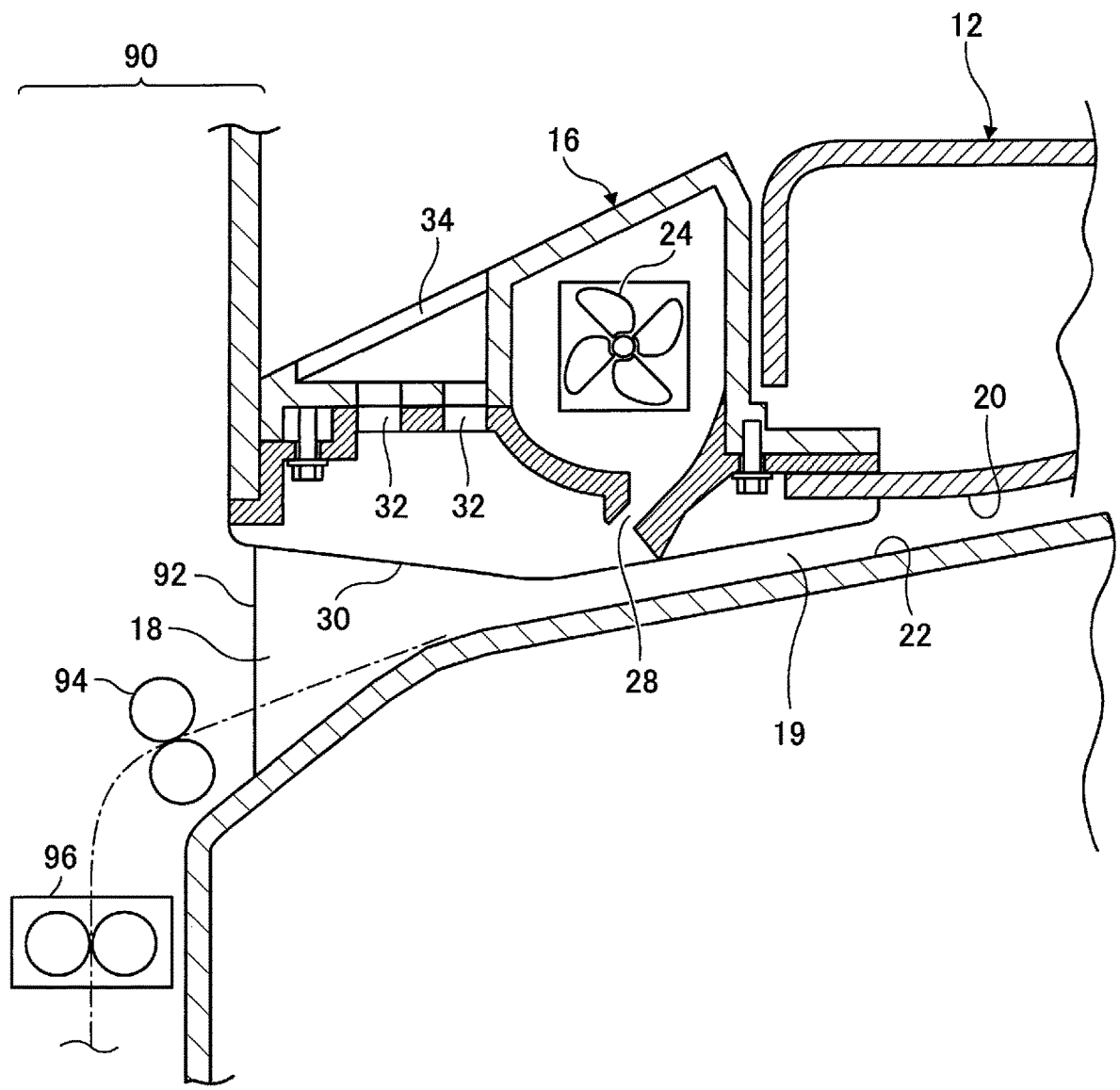
FIG. 4 is a schematic sectional view of the duct and a region near the duct of the sheet transport device according to the exemplary embodiment of the present invention.
Figure 5:
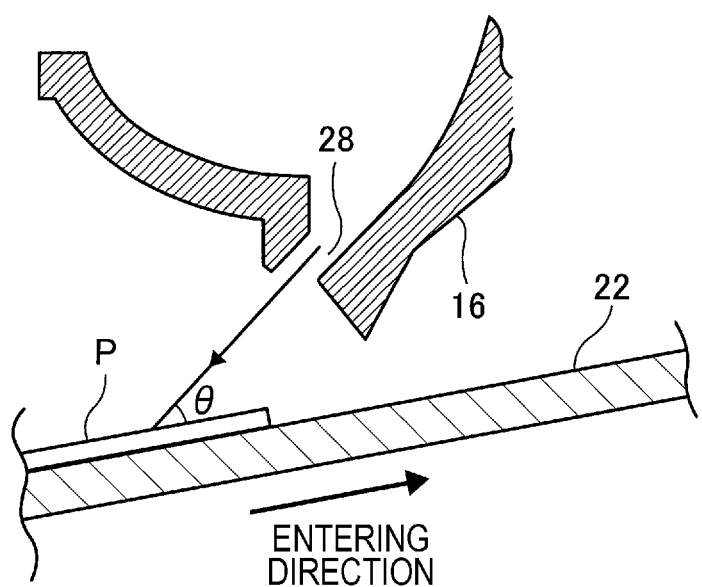
FIG. 5 illustrates a blowing direction of an airflow blown toward a sheet through the slit of the duct according to the exemplary embodiment of the present invention.

FIG. 4 is a schematic sectional view of the duct 16 and a region near the duct 16 of the sheet transport device 12. FIG. 5 illustrates the slit 28 formed in the duct 16. As illustrated in FIG. 4, an output roller 94 and a fixing device 96 are provided upstream of a sheet output opening 92 of the image forming apparatus 90 in the sheet transport direction. In FIG. 4, and also in FIG. 6, which will be described later, for the purpose of description, the fan motor 24 is illustrated such that the fan motor 24 stands erect in the sheet width direction in the duct 16. However, actually, the fan motor 24 is inclined from the sheet width direction toward the upper surface as illustrated in FIG. 3.

As illustrated in FIG. 4, an upper guide portion 20 and a lower guide portion 22 define a transport path 19. Furthermore, the guide member 30 of the duct 16 defines part of the transport path 19.

The lower surface of the duct 16 in which the slit 28 is formed and which faces the transport path 19 is curved. Furthermore, a surface of the guide member 30 that faces the transport path 19 is smooth.

Furthermore, as illustrated in FIG. 5, the slit 28 is inclined at θ degrees relative to a counter direction to an entering direction of a sheet P (sheet transport direction). The angle θ is smaller than 90 degrees relative to the counter direction to the sheet P entering direction. Preferably, the angle θ is, for example, about 45 degrees.

Furthermore, plural outlets 32 are formed in the duct 16 at positions upstream of the slit 28 in the sheet transport direction. The airflow that has been blown through the slit 28 and has struck the sheet P is discharged through the outlets 32. The outlets 32 are each defined between the plural blade members.

Figure 6:
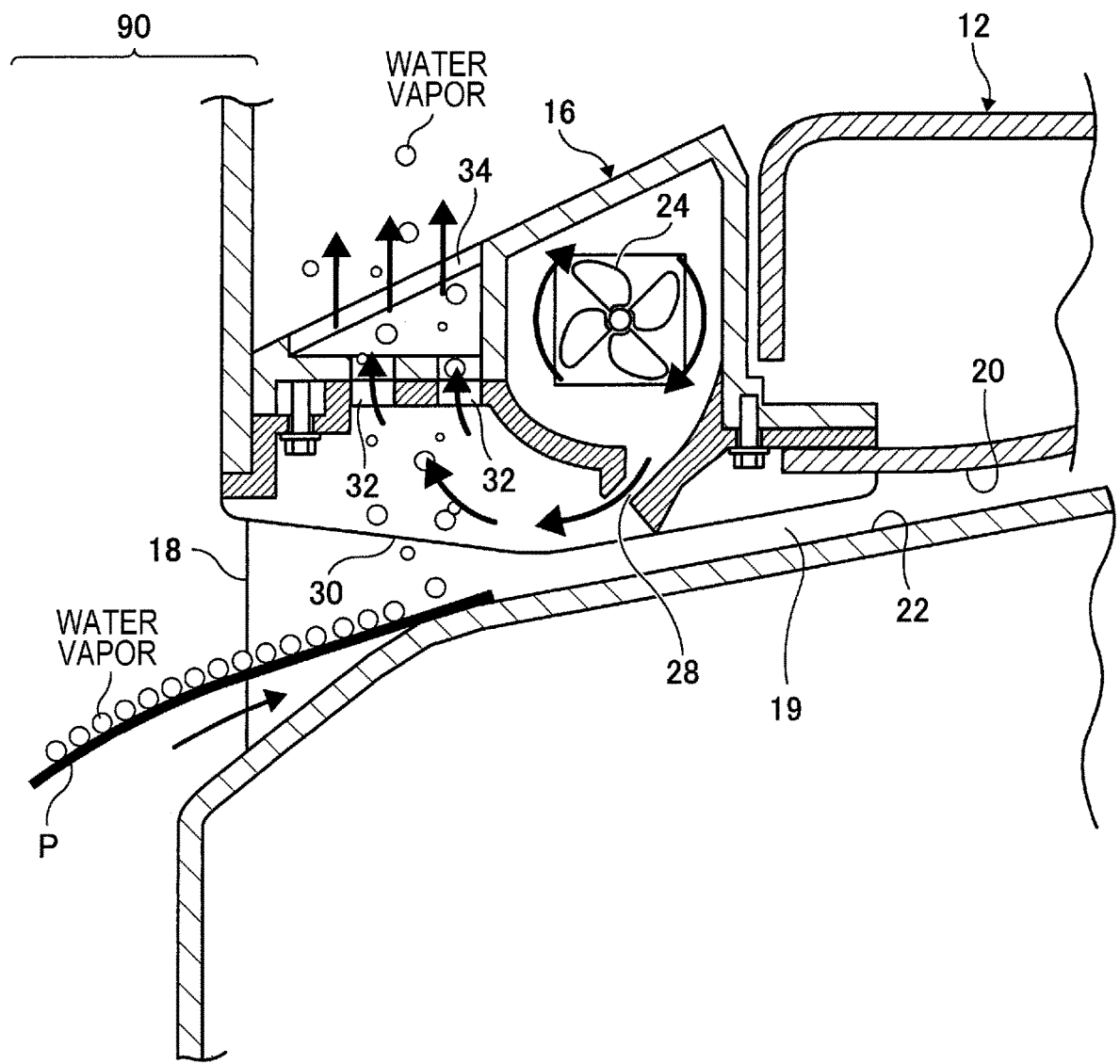
FIG. 6 illustrates the airflow in and near the duct of the sheet transport device according to the exemplary embodiment of the present invention.

FIG. 6 illustrates the airflow in and near the duct 16 of the sheet transport device 12 according to the exemplary embodiment of the present invention.

The sheet P having been heated by the fixing device 96 enters through the sheet receiving opening 18 while the high temperature of the sheet P is maintained and water vapor clings to the surface of the sheet P. The fan motor 24 is rotated so as to blow through the slit 28 in an opposite direction to the sheet P transport direction.

The airflow having been blown by the fan motor 24 is blown from the one end side toward the other end side in the duct 16. Furthermore, this airflow is blown out through the slit 28 toward the sheet P being transported. At this time, the airflow is blown in a direction inclined at smaller than 90 degrees, and preferably, at about 45 degrees relative to the counter direction to the sheet transport direction. The airflow blown through the slit 28 generates an air curtain uniformly in the sheet width direction. The air that enters together with the sheet P having undergone fixing and contains water vapor is interrupted at the front end portion of the sheet transport device 12 and discharged to the outside of the device through the outlets 32 and the outlets 34.

For example, when the fan motor 24 is directly provided in the upper guide portion 20 that defines the transport path 19, the airflow is blown toward the sheet P in a non-uniform manner. In this case, in order to blow the airflow over the entire width of the sheet P, it is required that plural fan motors 24 be installed. That is, the number of components increases, noise due to drive of the fan motors 24 is generated, and, compared to the above-described structure in which a single fan motor 24 is provided, power consumption increases.

According to the present exemplary embodiment, an airflow is generated from the one end portion side toward the other end portion side in the duct 16 provided in the width direction of the transport path, and the airflow is blown in an arrow direction illustrated in FIG. 6 with the slit 28 inclined relative to the sheet entering direction so as to be discharged to the outside of the device through the outlets 32 and the outlets 34. Accordingly, the air curtain is generated uniformly in the sheet width direction, and the air containing water vapor clinging near the surface of the sheet P having undergone the fixing is interrupted and discharged to the outside of the device. That is, before the sheet P is transported into the sheet transport device 12, the air containing water vapor is uniformly interrupted in the sheet width direction. Thus, condensation in the sheet transport path may be prevented.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A post processing apparatus comprising:
   a post processing unit configured to perform a post process on a sheet of paper;
   a duct; and
   a blower configured to blow an airflow to the duct,
   wherein the post processing apparatus has a transport path through which the sheet is transported toward the post processing unit from an image forming apparatus after completion of image formation on the sheet,
   wherein the duct is provided in a width direction of the transport path,
   wherein the duct has a slit formed in a sheet width direction, and the airflow having been blown by the blower is blown through the slit toward the sheet in the transport path being transported in a transport direction to the post processing apparatus,
   wherein the blower is configured to blow the airflow through the slit and directly onto the sheet in a direction opposite to the transport direction, and
   wherein the duct comprises an outlet through which the airflow having been blown through the slit and having struck the sheet is discharged to an outside of the post processing apparatus.

2. The post processing apparatus according to claim 1, wherein a blowing direction of the airflow blown through the slit is inclined at a smaller angle than 90 degrees relative to a counter direction to a sheet entering direction.

3. The post processing apparatus according to claim 1, wherein the duct has an end portion, and
   wherein the blower is disposed at the end portion of the duct.

4. The post processing apparatus according to claim 3, wherein a width of the slit increases as a distance from a side where the blower is disposed increases.

5. The post processing apparatus according to claim 1, wherein a guide member is provided at a portion of the duct where the slit is formed, and
   wherein the guide member is configured to guide transportation of the sheet by preventing a leading end of the sheet having been transported to the post processing apparatus from reaching the slit,
wherein the guide is upstream and downstream of the slit.

6. The post processing apparatus according to claim 5, wherein the guide member includes a plurality of blade members, and each of the plurality of blade members is provided perpendicular to the sheet transported to the post processing apparatus.

7. The post processing apparatus according to claim 1, wherein the duct is provided at a front end of the transport path on an upstream side in a sheet transport direction.

8. The post processing apparatus according to claim 1, wherein the post processing apparatus has an outlet through which the airflow having been blown through the slit and having struck the sheet is discharged to an outside of the post processing apparatus.

9. The post processing apparatus according to claim 1, wherein the transport path is configured to transport the sheet toward the post processing unit after a fixing device of the image forming apparatus has completed the image formation on the sheet.

10. The post processing apparatus according to claim 1, further comprising a transport part, which includes the transport path, the transport part configured to physically connect to an output of a fixing device in the image forming apparatus with the post processing apparatus.

11. The post processing apparatus according to claim 1, wherein the outlet is separate from an exit through which the sheet is discharged to the outside of the post processing apparatus.

12. The post processing apparatus according to claim 1, wherein the duct comprises a guide member having a plurality of blades, and
wherein the outlet is between the blades such that the airflow having been blown through the slit and having struck the sheet is discharged to the outside of the post processing apparatus through the outlet between the blades.

13. The post processing apparatus according to claim 1, wherein the blower is further configured to blow the airflow through the slit such that the airflow is transported both away from an exit of the sheet from the post processing apparatus and also towards the image forming apparatus.

14. The post processing apparatus according to claim 1, further comprising a guide plate along which the sheet is transported in the transport direction, wherein the slit is angled towards the guide plate such that the airflow is blown from the blower directly onto the sheet.

* * * * *